United States Patent [11] 3,582,620

| [72] | Inventor | Philippe Noetinger |
| | | Issy les Moulineaux, France |
| [21] | Appl. No. | 614,885 |
| [22] | Filed | Feb. 9, 1967 |
| [45] | Patented | June 1, 1971 |
| [73] | Assignee | Compagnie Generale D'Automatisme |
| | | Paris, France |
| [32] | Priority | Feb. 9, 1966 |
| [33] | | France |
| [31] | | 49,040 |

[54] METHOD AND APPARATUS FOR MEASURING THE CONCENTRATION OF AUTOMOTIVE TRAFFIC
28 Claims, 7 Drawing Figs.
[52] U.S. Cl. .................................................. 235/150.24,
340/31, 235/150.2
[51] Int. Cl. ........................................................ C06f 15/48
[50] Field of Search ............................................ 235/150.24,
150.2, 193; 340/22, 31, 38

[56] References Cited
UNITED STATES PATENTS
| 3,239,653 | 3/1966 | Barker ........................ | 235/150.24 |
| 3,239,805 | 3/1966 | Brockett ..................... | 235/150.24 |
| 3,274,547 | 9/1966 | Bolton ........................ | 235/150.24 |
| 3,315,065 | 4/1967 | Auer, Jr. ..................... | 235/150.24 |
| 3,290,490 | 12/1966 | Auer, Jr. ..................... | 235/150.24 |
| 3,406,395 | 10/1968 | Zupanick ................... | 235/150.24X |

*Primary Examiner*—Malcolm A. Morrison
*Assistant Examiner*—Joseph F. Ruggiero
*Attorney*—Craig, Antonelli, Stewart & Hill ABSTRACT: Device for the control of a signaling system for automotive traffic including a plurality of spaced local vehicle detecting devices providing indication of passage of each vehicle and speed thereof, a counter for counting the number of vehicles which pass each detecting device and a clock for indicating the time for passage of a given number of vehicles, the time from the clock and speed indication from the detecting device being compared with known parameters in a comparator to provide a control signal indicative of traffic conditions.

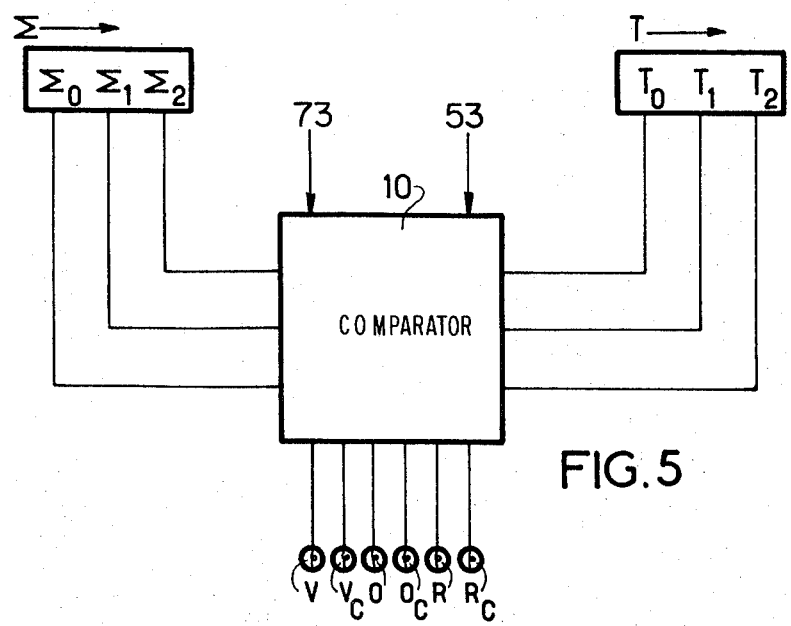
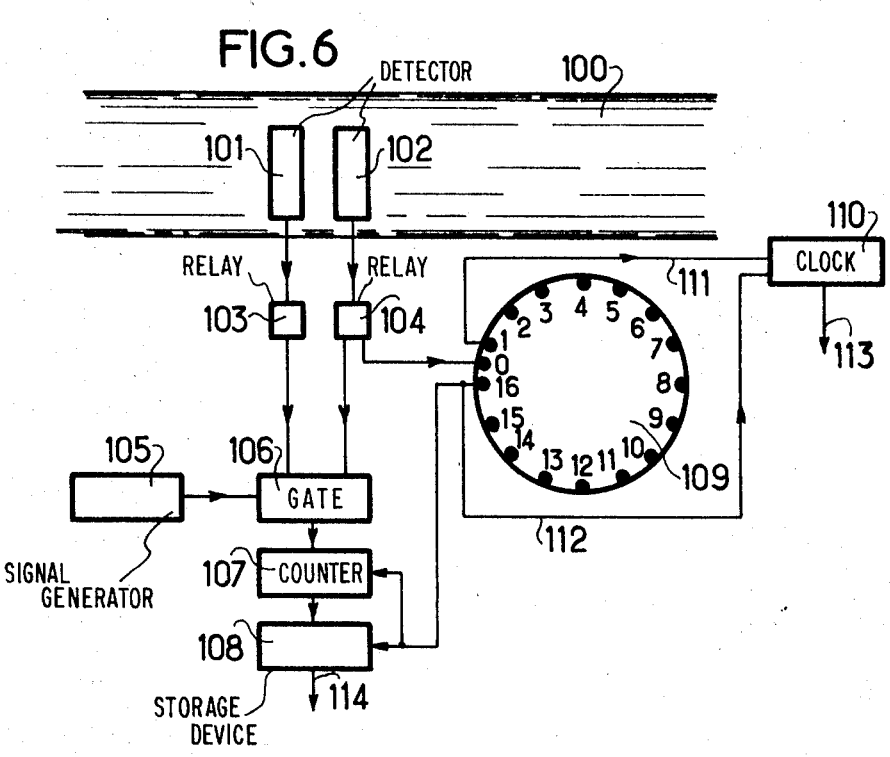

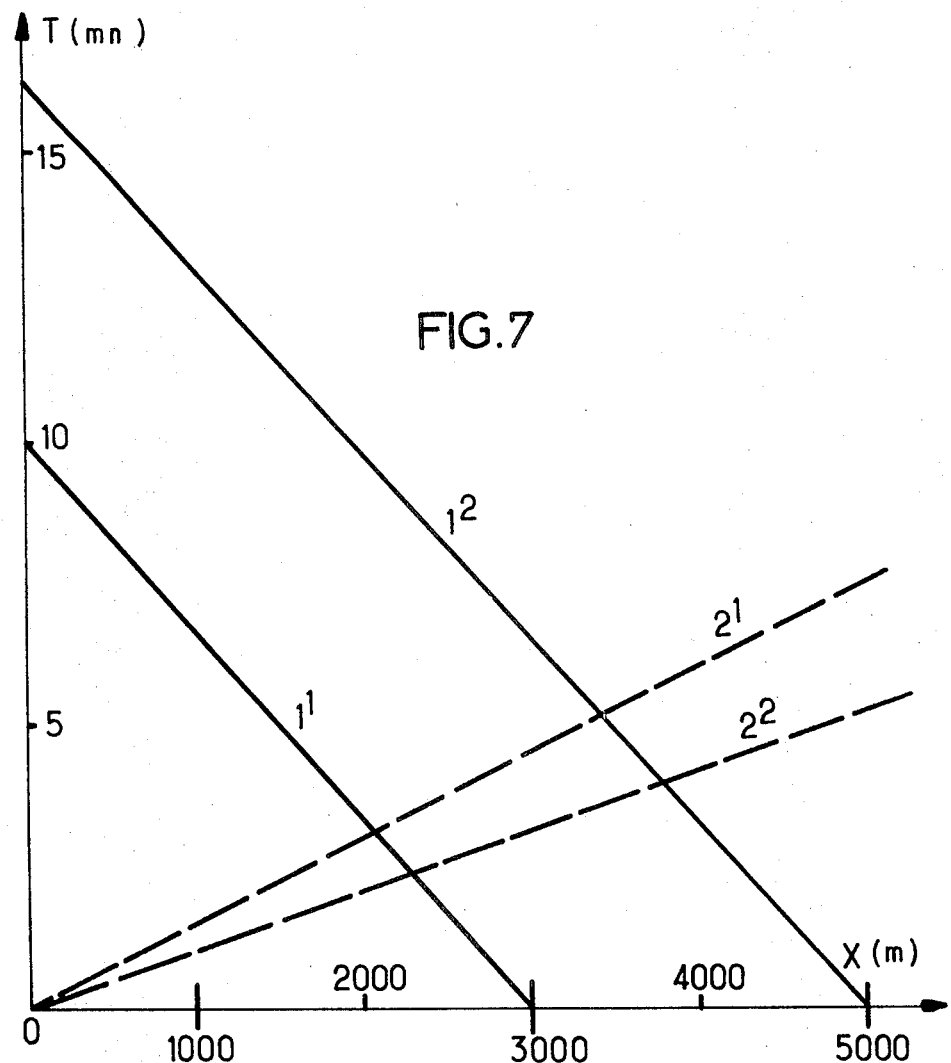

METHOD AND APPARATUS FOR MEASURING THE CONCENTRATION OF AUTOMOTIVE TRAFFIC

The present invention is concerned with the problem of automatically measuring the congestion of a highway over which vehicles travel, and particularly the congestion of an express highway, turnpike, or the like.

It is the principal object of limited access express highways to allow for a high volume of vehicles. It is noted, however, that the highest volumes theoretically obtainable are rarely reached on the days where this is most necessary, namely on Sundays and holidays.

The present invention relates to a method and to a device for measuring the concentration of the automotive traffic, and more particularly to a control system for controlling the traffic on an express highway in response to detected traffic conditions.

The present invention is directed to a device for the control of a signaling system indicating the degree of fluidity of the automotive traffic on a highway, comprising a plurality of local detecting systems which are disposed along the highway at points at a distance of several kilometers from each other, each system being characterized in that it comprises a device for detecting the passage of successive vehicles at a fixed point on the highway and for emitting an output signal for each of the vehicles being detected. A ring-counter whose total capacity is equal to a given integer $n$ is fed by the output signals of the aforementioned detecting device and the resulting detection provides an indication which is augmented by one unit per detected vehicle. The counter further includes elements for emitting a signal when the count achieved is 1 or $n$ and elements for the return thereof to zero under the action of an external signal. An electric clock is provided which is adapted to be started when the number posted by the above-mentioned counter is 1 and adapted to be returned to zero when the number posted by the counter is $n$. This clock is adapted to emit an external signal for effecting the return to zero of the aforementioned counter when it has measured a given time $T_2$, and is adapted to supply to the output terminals thereof a signal for the entire duration within which it measures the time. The system also provides a device for measuring a quantity $\Sigma$ proportional to the sum of the speeds of successive vehicles, or a quantity $s$ proportional to the sum of the inverse values of the speeds, and a storage device collecting the values of $\Sigma$ (or $s$) when $n$ vehicles have been counted or when a time $T_2$ has elapsed from the passage of the first vehicle which has been counted. A comparator having one input which is fed by the electronic clock and the other which is fed by the aforementioned storage system compares the aforeindicated value of $\Sigma$ (or $s$) and the passage time of the vehicles corresponding to a series of values of $\Sigma$ (or $s$) and a series of preposted values of $T$ and supplies a control signal either to one or the other of a group of signaling means depending upon whether the value $\Sigma$ (or $s$) or $T$ is present in either one or the other of the areas being delimited by these preposted values.

In a preferred embodiment of the present invention, each local detecting system comprises, for purposes of the measurement of the quantities proportional to the sum of the speeds of the vehicles passing before a fixed mark, a radar transmitter-receiver for detecting the passage of vehicles, associated with a frequency meter for determining speed. The means for detecting the passage of the vehicles is constituted by a passage-detecting loop which may be associated with a ring counter.

According to a modified embodiment of the present invention, each local detection system comprises, for purposes of the measurement of the quantities proportional to the sum of the inverse values of the speeds, two passage-detecting devices spaced by a distance of several meters in operative engagement with a frequency meter on the one hand, and with a ring counter on the other hand.

In the two aforementioned embodiments of the local modular system, the counter includes means for furnishing electrical signals for certain counted values as well as means for returning the counter to zero.

The system also comprises, in these two embodiments, a clock for measuring the time and having means for the start and for the return to zero thereof by means of electric signals and being itself adapted to furnish electrical signals when a certain period of time has been measured.

In the two embodiments indicated above, the system has a storage device which allows for collecting the data furnished by the frequency meter and has means for the return to zero thereof.

In both of the embodiments indicated above, the system comprises a comparator, which makes it possible to analyze the data furnished, respectively, by the frequency meter or the counter and the clock, and for controlling the signaling devices in response thereto.

Each local modular system comprises moreover connecting means to a local station with a view toward transmitting thereto the data which has been collected.

The present invention will now be further described hereinbelow on the basis of the two aforementioned embodiments thereof and in conjunction with the accompanying drawings wherein.

Figure 3:
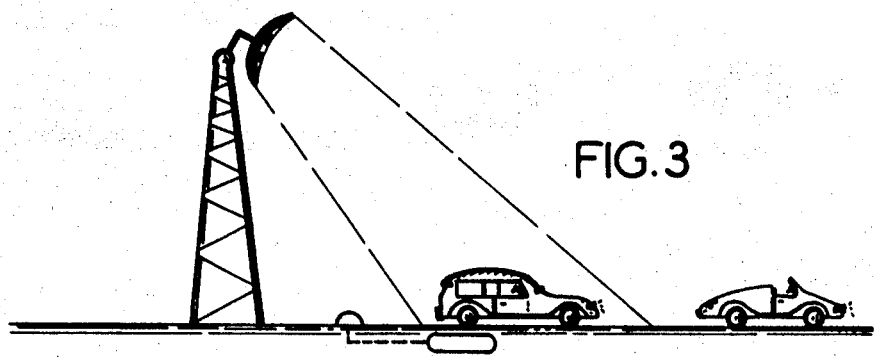
FIG. 3 is a schematic elevational view of a portion of the highway equipped with a detecting radar and with a passage-detecting device.
Figure 4:
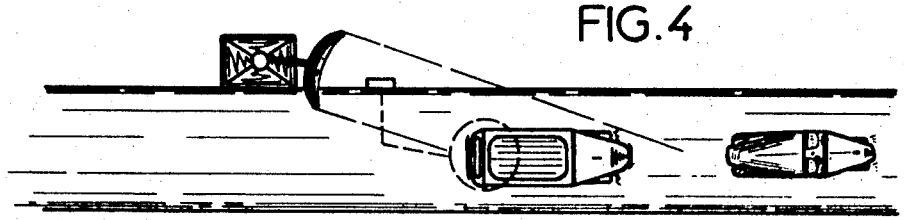

FIG. 4 provides a top view of the arrangement of FIG. 3;

FIG. 5 is a basic schematic block diagram of the comparator;

FIG. 6 is a basic schematic diagram of a second embodiment of the present invention; and FIG. 7 illustrates the curves serving for the determination of the space separating two local detecting systems.

Before specifying the features of the present invention, it is necessary to define a certain number of parameters which govern the traffic of vehicles on a highway, and to propound certain working hypotheses which make it possible to establish the concepts of traffic flow and of the evolution of the flow over a period of time.

The assumptions will be made and parameters selected at all times by considering a one-lane highway, since it is sufficient to multiple the representative quantities per lane by the number of lanes of the highway in order to obtain the quantities for the actual highway being envisaged.

On an express highway the entry to which and the exit from which are free, two traffic cases may be considered, i.e. as the first case: if the number of vehicles being in transit on the lane is small, the distribution of the vehicles along the lane depends on statistical laws, and it may be said that, in the absence of incidents or of accidents, there arises no problem; as a second case: if an accident occurs and produces a bottleneck, the upper part of this bottleneck will show, in the absence of warning signals and allowing for a certain volume at the entrance, a growing concentration of vehicles during the time immediately following the accident, which concentration will become manifest by a decrease in the average distance separating two vehicles.

A growing concentration as a function of time is observed also when the volume of vehicles injected into the lane within a given period of time increases (time point), with the entry and the exit of the lane being free and in the absence of any incident. There will then be produced on the lane a sort of equilibrium of the volume being introduced by the spacing necessary for the safety of the vehicles, these intervals being a function of the velocity of the flow of traffic. As will be seen hereinafter, this equilibrium may rapidly become unstable.

We shall now proceed to define the traffic parameters and the laws of a uniformly distributed traffic. The *hourly volume* of a lane is the number of vehicles passing by a given point of a lane during one hour. It will hereinafter be designated by reference symbol $Q$. The *average speed* of the vehicles being present over a unit of length of the lane will be designated with $v_m$. The reference symbol $e_m$ finally will be used to designate the *average spacing* of the vehicles, that is to say, the average distance which separates the front of a vehicle from the front of the vehicle which either follows or precedes it.

If the volume is regular, it may be assumed that the average distance between the vehicles can be represented by a parabolic function of the average speed of the vehicles, which may be expressed by the relationship $$e_m = \alpha v_m^2 + \beta v_m + \gamma,$$

where $e_m$ is in meters;

$v_m$ is in m./s.; and $\gamma$ is an average value based primarily on average vehicle length.

The quantities $\alpha$, $\beta$ and $\gamma$ are three coefficients which may be determined, for example, by setting forth the following hypotheses:

1. For $v_m = o$ (stopped traffic), the vehicles have an average spacing $e_m$ of 7 meters, hence $\gamma = 7$.
2. The maximum volume is to be produced for $v_m = 60$ km./h. or approximately 16 m./s.

Then $Q$ (vehicles per hour) $= 3600 \, V_m$ (meters per hour)/$e_m$ (meters per vehicle); and the rate of change of the quantity $Q$ with change in speed $v$ becomes $$\frac{dQ}{dv} = \frac{e_m - v_m \frac{de}{v}}{e_m^2} = \frac{\alpha v_m^2 + \beta v_m + \gamma - v_m(2\alpha v_m + \beta)}{e_m^2}.$$

Thus $$\frac{dQ}{dv} = \frac{-\alpha v_m^2 + \gamma}{e_m^2}$$

If the maximum volume is to be achieved for a speed of 16 m/x, then $dQ/dv = 0$ when $v_m = \sqrt{\gamma/\alpha} = 16$, hence $\alpha = \gamma/v_m^2 = 7/256 = 0.027$.

3. When choosing a pair $e_m$, $v_m$, for example:

$v_m =$ m./s. (36 km./h.) $e_m = 20$, one then finds $\beta = 1$.

As a result of the foregoing hypothesis, the following relationship is determined:

$$e_m = 0.027 \, v_m^2 + v_m + 7 \quad (1)$$

It will be noted that the parabolic law effectively possesses a maximum, which will not create a situation of the type $e_m = k \, v_m$; this relationship is thus more in conformity with realistic conditions.

The *hourly volume* $Q$ may now be written as $$Q = \frac{3600 \, v_m}{\alpha v_m^2 + \beta v_m + \gamma} \quad (2)$$

and the *concentration*, which we define as the number $c$ of vehicles traveling over a given lane portion having a length of 1000 meters, is defined by $$c = \frac{1000}{e_m} = \frac{1000}{\alpha v_m^2 + \beta v_m + \gamma} \quad (3)$$

Figure 1:
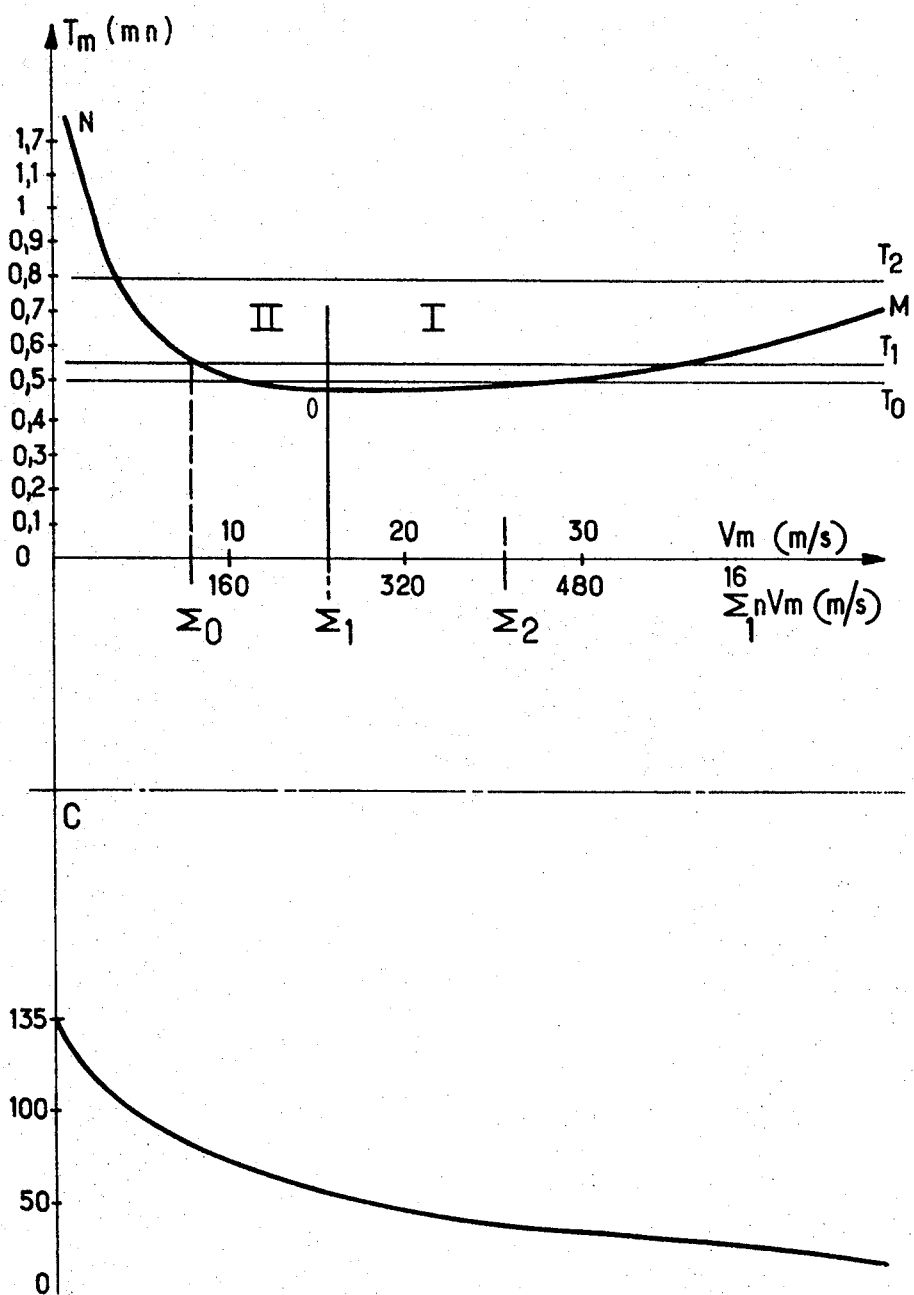
FIG. 1 shows as function of the average speed the characteristic curves of uniformly distributed traffic; namely, in the upper portion thereof the curve $T_m$ of the average passage time of 16 vehicles for variation in speed thereof, and in the lower portion thereof the curve of the concentration of traffic.

The lower portion of FIG. 1 shows a curve which is representative of the variations in the concentration $c$ as function of the average speed $v_m$ (expressed in meters per second). The curve is substantially uniform in variation; $c$ varies in the inverse sense of $v_m$ in accordance with the relationship in formula (3).

With the aid of formulas (1), (2) and (3) it is possible to determine other interesting quantities. One of these quantities is the passage time $T_m$ of $n$ uniformly distributed vehicles, or $$T_m = \frac{n e_m}{v_m} \quad (4)$$

The upper portion of FIG. 1 is the curve of the time $T_m$ as function of the average speed $v_m$ for a number $n$ fixed at 16, in accordance with the relationship of formula (4).

The curve $T_m = g(v_m)$ passes through a minimum for the value $v_m = \sqrt{\gamma/\alpha}$ already established hereinabove. It may be said that under normal traffic conditions, $n$ vehicles must pass within a time period comprised between $T_0$ and $T_2$, the time $T_0$ being chosen near the minimum of the curve $T_m(v)$ and the time $T_2$ corresponding to a slow traffic near complete standstill, but nevertheless moving. In the case where one assumes $n = 16$, these times will be taken, prespectively, close to 0.5 and 0.75 minute. The curve $T_m(v_m)$ is a curve representative of the volume since $T_m = n/Q$.

Let it be assumed that the minimum of this curve is a definite value and a line parallel to the axis $T_m$ passing through this minimum delimits two zones, which are marked I and II in the FIG. 1. The portion of curve $T_m(v_m)$ relating to the higher speeds (part OM of the curve in zone I) is substantially parallel to the axis $v_m$ for much of its length. This means that, if the traffic is uniformly distributed and rapid, the time of passage of $n$ vehicles is almost constant, being independent of the particular speed. The more the passage time increases in this zone, the more concentration of traffic is reduced, as seen by curve $c$ at the lower part of FIG. 1, and there is thus less risk of accidents. If, by chance, this time passes to another lower value, this means that the traffic is still flowing, but the risk of accidents increases. We may therefore consider the zone I as a zone of stable traffic since the concentration decreases if the average passage time and the speed increase.

Within the portion of the curve $T_m(v_m)$ relating to low speeds (zone II), a small variation of the passage time of 16 vehicles brings about a small variation in speed and a great variation in concentration $c$. The part ON of the curve may thus be considered as representing unstable conditions since an increase in the passage time results at the same time in a decrease of the speed of traffic and an increase in the concentration thereof.

The curve $c$ loses its significance as soon as the concentration is sufficiently low that the distribution becomes again consonant with a statistical pattern, but it will be seen that it is possible to break away from this case with the aid of the variable $T$ defined above.

It shall now be demonstrated how in accordance with the present invention it is possible to measure the concentration defined hereinabove with the aid of an apparatus which makes it possible to measure a quantity $v$ proportional to the speed of each vehicle passing by a given point of the lane, with the aid of an apparatus which makes possible a determination of the sum total of the values of $v$ relative to $n$ successive vehicles passing before the apparatus, and with the aid of a clock which makes it possible to measure the passage time $T$ of the vehicles.

It is assumed that the measurement of this sum and the measurement of the passage time of the vehicles be repeated each time either (a) that a fixed number $n$ of vehicles has passed by within a time shorter than the time $T_2$ defined hereinabove, or (b) each time that a time period $T_2$ has elapsed. For the case where a number of vehicles $n$ has passed within a time period very close to $T_0$, the device which totals the quantities proportional to the respective velocities of each of the $n$ vehicles records a value which is essentially proportional to the concentration of the vehicles on one lane (quasi-rectangular portion of the curve $T_m(v_m)$.

For the case where a time equal to $T_2$ has elapsed and a number of vehicles smaller than $n$ has passed, two cases are to be considered:

2.1. The value being posted by the device totaling the quantities proportional to the respective speeds of the vehicles which have passed during the time $T_2$ is small. This means that the vehicles proceed slowly; thus there is saturation.

2.2. The value posted by the totaling device is high. This means that the vehicles pass by rapidly and that the traffic is very fluid, but widely dispersed.

The present invention relates to a device which, for the purpose of putting into practice the preceding considerations, makes it possible to determine a qualitative value of the concentration of vehicles over a portion of the highway for carrying out a quantitative measurement, for transmitting and for analyzing this information with a view toward starting simultaneously or independently signaling means being designed for either a synoptic control or for appropriate control by the vehicle drivers themselves.

In FIG. 1, the curve of the concentration c has been outlined by taking into account the hypotheses mentioned hereinabove, namely a uniformly distributed traffic and an average spacing or distance between each vehicle as a parabolic function of the average speed. The curve of the average passage time $T_m$ of $n$ vehicles as a function of the speed has been shown for $n=16$.

There has been defined a time $T_0$ corresponding to the minimum of the curve $T_m(v_m)$, a time $T_1$ near $T$ in the order of 1.1 $T_0$, and a time $T_2$ close to 1.5 $T_0$. $T_1$ will make it possible to determine the direction of change (i.e. increase or decrease) of the traffic flow, as will be shown hereinafter after. $T_2$ corresponds in the zone II of the curve $T_m$ to an average speed near 15 km./h., or a very slow, almost blocked traffic.

Figure 2:
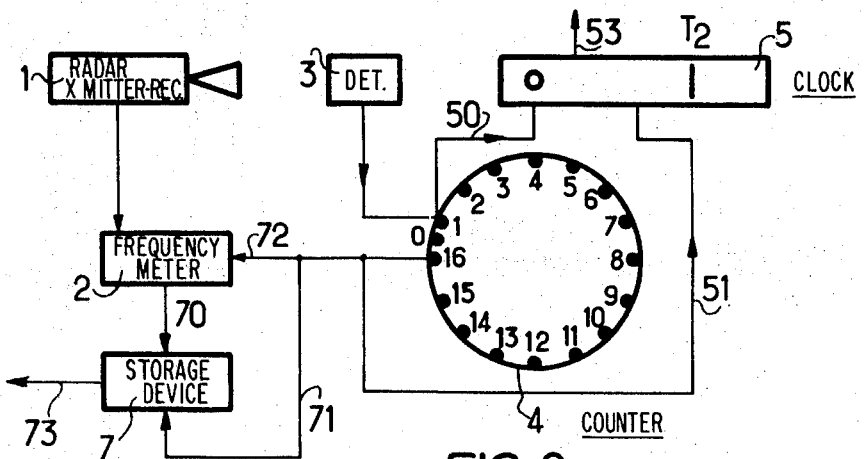
FIG. 2 illustrates a basic schematic diagram of a first embodiment of the present invention for the measurement of the concentration of traffic.

The device 1, illustrated in FIG. 2, makes it possible to determine a quantity proportional to the speed of a vehicle. According to a preferred embodiment of the present invention, this device is a radar transmitter-receiver emitting a frequency wave $f$. At the moment when a vehicle penetrates into the field of the wave, this wave is reflected with a frequency $f+\Delta f$, the quantity $\Delta f$ being called Doppler frequency which is proportional to the speed of the vehicle. The radar is connected to a frequency meter 2 which is controlled to receive the Doppler frequency $\Delta f$ during a very short time $\Delta t$ in the order of $10^{13} s$. The frequency meter furnishes a speed indication proportional to $\Delta f \Delta t$. When a second vehicle approaches, the frequency meter collects corresponding speed signal during the same time interval $\Delta t$, and so forth.

Therefore, when an $n$ number of vehicles—which, by way of example, has been chosen to be equal to 16 for the present embodiment—has passed into the field of the radar, the frequency meter has added a quantity equal to $$\sum = \sum_{n=1}^{n=16} K_s \Delta f_n \Delta t$$

$$\sum_{n=1}^{n=16} v_n$$

A detecting device 3 for the passage of the vehicles, which may advantageously be constituted by an electric detecting loop having a variable inductance, furnishes a signal each time a vehicle passes into the field of action of the loop. Any of the other known detecting means, such as a detector having a resonant circuit, a capacitive circuit, a magnetic circuit, an optical detector, an infrared, ultrasonic, or radar detector, or mechanically actuated pedal devices, may be utilized as modifications in the device according to the present invention.

This detecting device 3 is connected to a counter 4 having a counting capacity of $n$ vehicles, in this case 16. A clock 5 is started by a signal from counter 4 on line 50 when a first vehicle is detected. A connection 51 from the clock 5 to the counter 3 allows the return to zero of the clock when the counter 4 has registered 16 vehicles.

The frequency meter 2 is connected with a storage device 7 which receives, by means of a connection 70, the information contained in the frequency meter. This storage device is set to zero via line 71 when the counter 4 marks the maximum value, 16 in this case. Finally, a connection 72 links the counter to the frequency meter for the return to zero thereof when the counter marks the maximum value.

The operation of the device is as follows:

At zero time just prior to the passage of the first vehicle, the clock 5 is at zero; the frequency meter 2 is also at zero. The passage of a vehicle simultaneously into the loop and the radar field starts the clock, causes the frequency meter to register a quantity $\Delta f_1 \Delta t$ and causes the counter to advance by one unit. The passage of a second vehicle makes the counter once again advance by one unit, adds a quantity $\Delta f_2 \Delta t$ to the frequency meter while the clock 5 continues to mark the time from zero time.

A measuring sequence will consist in the gathering of the data from frequency meter 2 either during the passage time of 16 vehicles, if this time is shorter than $T_2$, or during a time $T_2$. In the first case, a signal on lines 72 and 71 originating from the counter after the passage of the 16th vehicle will return the storage device to zero and then proceed with the transfer of the contents of the frequency meter equal to $\Sigma = \Sigma^{16}{}_1 K_s \Delta f \Delta t$ via line 70 into the storage device and return the frequency meter and the clock to zero. The 17th vehicle which will be the first one of the next-following sequence will start the clock again and a new sequence will be covered. In the second case, it is at the beginning of a time equal to $T_2$ that the above-mentioned steps will be repeated and the first vehicle passing by after this time $T_2$ will produce the start of a new sequence.

A comparator 10 (FIG. 5) is provided for analyzing after each sequence the values of $\Sigma$ and of $T$ derived from storage device 7 and clock 5, respectively. For this purpose, the input terminals of the comparator are connected respectively to output 73 of storage device 7 and to output 53 of the clock 5.

The comparator 10 makes it possible to compare simultaneously the values of $\Sigma$ and of $T$ with a series of fixed values, for example, with the three values $\Sigma_o$, $\Sigma_1$ and $\Sigma_2$ and with the three values $T_o$, $T_1$ and $T_2$. These values may be chosen in a manner such that $\Sigma_2 > \Sigma_1 > \Sigma$ and that $\Sigma_2$ corresponds to a heavy, rapid traffic and $\Sigma_o$ to a very slow traffic, $\Sigma_1$ having an intermediate value. $T_2$ and $T_o$ may be defined as hereinabove, $T_1$ having an intermediate value.

After each sequence, the comparator analyzes and compares the values of $\Sigma$ and of $T$ with the above-indicated fixed values and distinguishes the following cases:

(1) If $T > T_2$ with $\Sigma > \Sigma_2$, the highway is practically empty and the comparator furnishes a signal indicative of this condition, which may, for example, be used to energize a green light $v$.

(2) If $T_2 > T > T_1$ with $\Sigma_2 > \Sigma > \Sigma_1$, or if $T_1 > T > T_0$, the traffic is free and a green blinker light $v_c$ may be lighted.

(3) If $T_0 < T < T_1$ with $\Sigma_1 > \Sigma > \Sigma_0$, the traffic is concentrated but fluid; an orange signal $o$ is lighted.

(4) If $T_0 < T < T_1 \Sigma < \Sigma_0$, the traffic is concentrated, slowed up and close to instability; and an orange blinker signal $o_c$ is lighted.

(5) If $T_2 > T > T_1 \Sigma < \Sigma_0$, the traffic is slow and may rapidly become unstable; a red signal $R$ is lighted.

(6) If $T > T_2 \Sigma < \Sigma_0$, the traffic is blocked and a red blinker signal $R_c$ is lighted.

It will be noted that the comparator may receive, on the one hand, the time $T$ of a number $n$ cycle and, on the other hand, the $\Sigma \Delta f \Delta t$ of the preceding cycle (utilization of one storage state). In this case, there is a systematic detection of the evolution of the traffic provided that the value $T$ is applied to the comparator either at the end of the cycle, if $T < T_2$, or systematically as soon as in the course of the cycle, if $T > T_2$.

A device of this type will make it possible to follow the evolution of the traffic which, depending upon the conditions, will be translated into operative signals producing a passage of the indicators or signals from steady green to the blinking red following in order the intermediate stages in the case of an evolution toward a bottleneck, and vice versa. The number of fixed values transmitted to the comparator is not limited, of course, to the three values of $\Sigma$ and of $T$ and a greater number of values may readily be envisaged, which would supply or furnish a more accurate image of the condition of traffic.

According to another embodiment of the invention, the information furnished by the passage of 16 consecutive vehicles is collected whatever may be the time set for such passage. The clock is reset to zero only at the passage of the 16th vehicle and is restarted only at the passage of the 17th vehicle. If 16 vehicles pass by within a time period shorter than $T$, the process will not vary from the one described hereinabove. In the opposite case, where the time for passage of 16 vehicles is greater than $T_2$, the comparator is supplied the value $\Sigma$ indicated by the frequency meter when the clock passes to the time $T_2$. In this latter case, in order that the data given to the comparator be coherent, taking into account the fact that the latter is provided with comparative data $\Sigma_o$, $\Sigma_1$, $\Sigma_2$ which represent quantities relative to 16 vehicles, it is necessary to connect the output of the frequency meter 2 to a divider device which accomplishes the division of the quantity $\Sigma^1$ by the number $m$ of vehicles passing within the time $T_2$, then a multiplier which works the product of the quantity $\Sigma^1/m$ by 16.

FIG. 6 illustrates the basic diagram of the device for the measurement of the concentration according to a modified embodiment of the present invention. The reference mark 100 designates the traffic lane equipped with two passage-detecting devices 101 and 102, the direction of traffic being made from the loop 101 to the loop 102, as indicated in the drawing with an arrow.

The detecting devices may be one o<the T<a loop having a variable inductance preferred to other These devices are separated from each other by a sufficiently small distance that a vehicle passing over detector 101 is certain to pass over detector 102. A distance of several meters, two for example, is very favorable.

When a vehicle passes over the detection loops 101 and 102, an electric signal is emitted by each of the relay means 103 and 104. The device for measuring the concentration of traffic comprises furthermore a signal generator 105 having a very stable frequency and being connected to a totaling counter 107 by way of a gate 106. The counter 107 is connected to the input terminal of a storage device 108.

A ring-counter 109 which counts, for example, 16 stages is supplied with signals by one of the detecting loops, for example, the loop 102; it is connected moreover to a terminal of the storage device 108 for the purpose of resetting the device to zero under certain operating conditions which will be specified hereinbelow.

A clock 110 connected—for purposes of being started—to the position 1 of the counter 109 and to the position 16 for the purpose of the return to zero thereof completes the device. Reference numerals 113 and 114 indicate the respective outputs of the clock and of the storage device provided for application of suitable quantitative signals to a comparator, such as that shown in FIG. 5.

The operation of the device is as follows:

When a vehicle passes in proximity to the detecting loop 101, the electronic device 103 which is in operative engagement therewith opens the gate connecting the generator 105 with the counter 107. When the vehicle passes over the loop 102, the electronic device 104 which is in operative engagement therewith closes the gate 106. During the time comprised between these two operations, the generator 105 has produced in the counter a signal having a duration equal to the time of passage of the vehicle from one detector to the other, quantity $s$ thus being proportional to the inverse value of the speed of the vehicle. Furthermore, each beginning of excitation of the loop 104 actuates the ring-counter 109 which advances by one step. Finally, when the ring-counter marks 1 unit, an electric connection 111 starts the clock after the return to zero thereof. The clock may be stopped by means of a signal supplied by the counter and transmitted by the electric connection 112 when the counter marks the position 16.

As in the preceding embodiment, the passage of successive vehicles is made up of the measurement of the passage time with the aid of the clock 110, the counting of the vehicles with the aid of the ring-counter 109, and the measurement of a quantity $s$ equal to the sum of the inverse values of the speeds of successive vehicles.

A measuring sequence may be as follows:

At the passage of the first vehicle, the clock initially set to zero is started. The counter 107 also set at the zero value initially, post a first quantity $s_1 = k\,v_1$, wherein $K$ is a proportionality constant and $v_1$ the speed of the first vehicle. The clock 110 then continues to mark the time, and the passage of the second vehicle has the effect of causing the ring counter to be switched from the value 1 to the value 2 and of adding to the indication $s_1$ of the counter 107 a quantity $s_2 = k/v_2$ ($v$ being the speed of the second vehicle). The counter then records $s_1 + s_2$.

At the passage of the 16th vehicle, the clock is stopped, the storage device 108 is reset to zero and the contents of the counter 107 are then transferred into this storage device.

Disposed thereafter at the output of the storage device is a quantity $$s = \sum_{i=1}^{i=16} \frac{k}{v_i}$$

wherein $v_i$ represents the respective speed of 16 vehicles which have passed the detection area in the highway. Also disposed at the output of the clock is a time $T$ utilized by these 16 vehicles in passing in front of the measuring device.

As in the preceding embodiment it is possible to determine a certain number of threshold times on the clock, for example, three thresholds $T_o$, $T_1$ and $T_2$ and an equal number of values $s_o$, $s_1$ and $s_2$, for example. These values will make it possible to indicate by means of the comparator described hereinabove the type of traffic which exists at that time. It has to be noted, as a matter of fact, that the major portion of the curve $T_m$ being rather flat, one may assimilate to a close proportionality factor the quantity $$s = \sum_{i=1}^{i=16} \frac{k}{v_i}$$

to the inverse value of the quantity $\Sigma$ previously defined.

The conditions for energizing the different traffic signals will thus be analogous to those established hereinabove, by permuting the respective roles of $s_o$ and $s_2$ which take the place of $\Sigma_2$ and $\Sigma_o$, respectively.

According to a modified type of operation, one may provide a measuring sequence by resetting to zero the clock, the ring-counter and the totaling counter after the collection of data not only when 16 vehicles have passed by but also when a time $T_2$ has elapsed after the passage of the first vehicle of the sequence. This modification presents approximately the same advantages as the arrangement described hereinabove.

In order to accomplish the control of the traffic over the total road portion under consideration, local modular systems will be installed every $p$ kilometers, $p$ representing what we call the spacing factor. The space must be calculated in order to detect a bottleneck or an accident within delays being compatible with the speed of renewal of the concentration data. This renewal is in the order of 0.6 minute in the case of $n=16$ vehicles when the traffic is concentrated while still moving easily.

Let it be assumed that $E_1$ and $E_2$ are two modular systems being disposed on a road, $E_2$ being provided below $E_1$. It is further assumed that $P$ is the space ($P=E_1-E_2$) and that a point $M$ is situated between $E_1$ and $E_2$ where an accident occurs.

Such an accident will produce two inverse affects at $E_1$ and $E_2$, namely a. at $E_2$, a decrease in the flow of traffic. The traffic at $E_2$ was, for example, such that the signaling system was set with the blinking green or the steady orange. As a result of the accident at $M$, the traffic at $E_2$ will now become null and the signal will change to the continuous green indication after a short time.

$$t_2^{\text{minute}} = \frac{ME_2}{60v} = \frac{X}{v_m} + T_2$$

wherein $T_2$ is the time for renewal of the information b. At $E_1$, an increase in the concentration of vehicles is evidenced. It is expressed by the appearance of the continuous red signal after the successive appearance of the intermediate signals. The time at the beginning of which the red light appears may be calculated with the aid of the formula $$t_1^{\text{second}} = \frac{(c_{\max}-c_o)(P-X)}{1000\,Q/s} + T_2$$

wherein $c_{max}$ is the maximum concentration, $c_o$ is the average concentration prior to the accident, and $Q/s$ is the volume per second.

$c_{max} - c_o$ is generally in the order of $100\, Q/s$
$Q/s$ is in the order of $0.5$.

hence $$t_1^{minute} = \frac{P-X}{5\cdot 60} + T_2$$

Shown in FIG. 7 in broken lines are the curves of the time $t_2$ which has been represented by two values of the average speed, at $2^1$, 36 km./s. and at $2^2$, 57.6 km./h. Shown in solid lines are the curves of the time $t_1$ for two values of the spacing $P$, namely for the curve $1^1: P = 3000\, m$ and for the curve $1^2: P = 5000\, m$.

It is apparent from these graphic illustrations that the utilization of a spacing $P$ of 3000 meters makes it possible to detect an accident wherever it may be, below within a time shorter than 5 minutes, and upstream or above the accident with a time comprised between 10 minutes and 17 minutes. If the accident occurs approximately midway of the local modular systems, these times will be respectively close to 3 and 6 minutes.

These values are very propitious in the measurement where they make it possible to rapidly detect the bottlenecks or accidents and to make the traffic detour before too large a number of vehicles are amassed upstream of the obstructed highway.

The present invention is by no means limited to the two embodiments described hereinabove. It is possible, more particularly, to apply thereto modifications concerning detail, to change certain provisions, or to substitute for specific means other equivalent means without departing from the spirit and scope of the present invention.

I claim:

1. An arrangement for the control of a signaling system indicating the degree of fluidity of the automotive traffic on a highway in the form of a plurality of local detecting systems disposed along the highway at given points separated by a predetermined distance each system comprising first means producing a first signal in response to detection of the passage of each vehicle past said given point of the highway and second means for producing a second signal indicative of the speed thereof, counter means having a total capacity equal to a given integer $n$ and connected to said first means for counting the occurrence of said first signals, said counter means emitting a third signal at a count 1 and a fourth signal at a count $n$, clock means actuated by said third signal and reset by said fourth signal for resetting said counter means at a time $T_2$ after actuation thereof, said clock means producing a continuous fifth signal during actuation thereof which is terminated upon resetting of said counter means, summing and storage means reset by said fourth signal and responsive to receipt of said second signals from said second means for producing a sixth signal proportional to the sum of the speeds of successive vehicles, and a comparator responsive to said fifth and sixth signals for generating an output control signal indicative of the relative value of said fifth and sixth signals to predetermined values representing prescribed traffic conditions.

2. The combination defined in claim 1 wherein said second means includes a radar device for generating said second signals.

3. The combination defined in claim 2 wherein said radar device is actuated by first means detecting the passage of each vehicle.

4. The combination defined in claim 1 wherein said count $n$ is equal to 16.

5. The combination defined in claim 1 wherein said signaling system includes a plurality of colored lights connected to said comparator, said control signal being capable of operating said lights continuously and intermittently.

6. The combination defined in claim 1 wherein said comparator compares each of said fifth and sixth signals to low, intermediate and high values of speed and time, respectively, and generates said output control signal having a value indicative of a particular combination of said relative comparison.

7. The combination defined in claim 1 wherein said second means includes a detector slightly spaced ahead of said first means in the direction of traffic movement for emitting a seventh signal upon passage of each vehicle, a signal generator emitting a signal of given frequency and gate means connected to said signal generator for passing said signal of given frequency, said gate means being actuated by said seventh signal and deactivated by said first signal, the output thereof forming said second signal.

8. The combination defined in claim 1 wherein said first means for detecting the passage of vehicles comprises a magnetic detection loop.

9. The combination defined in claim 1 wherein said first means for detecting the passage of vehicles comprises a variable inductance detection loop.

10. The combination defined in claim 1 wherein said first means for detecting the passage of vehicles comprises a radar device.

11. The combination defined in claim 1 wherein said first means for detecting the passage of vehicles comprises a variable capacity detector.

12. The combination defined in claim 1 wherein said first means for detecting the passage of vehicles comprises an optical detector.

13. The combination defined in claim 1 wherein said first means for detecting the passage of vehicles comprises an infrared detector.

14. The combination defined in claim 1 wherein said first means for detecting the passage of vehicles comprises a mechanically actuatable pedal device.

15. The combination defined in claim 1 wherein said first means for detecting the passage of vehicles comprises a supersonic detector.

16. An arrangement for the control of a signaling system indicating the degree of fluidity of the automotive traffic on a highway in the form of a plurality of local detecting systems disposed along the highway at given points, each system comprising first means responsive to detection of the passage of each vehicle past said given point of the highway for producing a timing signal proportional to the time expired during the passage of $n$ successive vehicles, second means for producing a speed signal proportional to the sum of the speeds of $n$ successive vehicles, and comparator means responsive to said timing and speed signals for generating an output control signal indicative of the relative value of said timing and speed signals to predetermined values representing prescribed traffic conditions.

17. The combination defined in claim 16, wherein said comparator means compares each of said timing and speed signals to low, intermediate and high values of time and speed, respectively, and generates said output control signal having a value indicative of a particular combination of said relative comparison.

18. The combination defined in claim 16, wherein said second means includes speed detecting means for detecting and summing the speeds of successive vehicles and storage means for periodically storing the output from said speed detecting means.

19. The combination defined in claim 18, wherein said first means includes vehicle detector means for detecting passage of a vehicle past said given point of the highway and counter means having a maximum count of $n$ connected to said vehicle detector means for counting the passage of vehicles, said counter means being connected to said speed detecting means for connecting the output thereof to said storage means each time the count of $n$ is reached.

20. The combination defined in claim 19, wherein said first means further includes clock means for counting time up to a time $T_2$, said clock means being started by said counter means at the count of 1 and being reset by said counter means at the count of $n$, the outputs of said clock and said storage means being connected to said comparator means.

21. The combination defined in claim 20, wherein said clock means produces a signal at time $T_2$ effecting transfer of the contents of said detecting means to said storage means and a resetting of said counter means.

22. Method of indicating the degree of fluidity of the automotive traffic on a highway comprising measuring the time for passage of $n$ successive vehicles past a point on the highway, measuring the average speed of the $n$ successive vehicles moving past said point, and comparing said measured values of time and speed to predetermined low, intermediate and high values of time and speed, respectively, representing prescribed traffic conditions.

23. The method as defined in claim 22, further including the step of actuating a first indicator when said measured value of time is greater than said predetermined high value of time and said measured value of speed is greater than said predetermined high value of speed indicating very light traffic.

24. The method as defined in claim 22, further including the step of actuating a second indicator when said measured value of time is greater than said predetermined high value of time and said measured value of speed is less than said predetermined low value of speed indicating blocked traffic.

25. The method as defined in claim 22, further including the step of actuating a third indicator when said measured value of time is less than said predetermined high value of time but greater than said predetermined low value of time and said measured value of speed is greater than said predetermined intermediate value of speed but less than said predetermined high value of speed, indicating that the traffic is free.

26. The method as defined in claim 22, further including the step of actuating a fourth indicator when said measured value of time is less than said predetermined intermediate value of time but greater than said predetermined low value of time and said measured value of speed is less than said predetermined intermediate value of speed but greater than said predetermined low value of speed, indicating that the traffic is concentrated but fluid.

27. The method as defined in claim 22, further including the step of actuating a fifth indicator when said measured value of time is greater than said predetermined low value of time but less than said predetermined intermediate value of time and said measured value of speed is less than said predetermined low value of speed indicating that the traffic is concentrated, slow and close to instability.

28. The method as defined in claim 22, further including the step of actuating a sixth indicator when said measured value of time is less than said predetermined high value of time but greater than said predetermined intermediate value of time and said measured speed is less than said predetermined low value of speed indicating that the traffic is slow and may rapidly become unstable.